(No Model.) 2 Sheets—Sheet 1.
W. HARRISON.
FLUID PRESSURE SHAFT SUPPORT.
No. 519,906. Patented May 15, 1894.
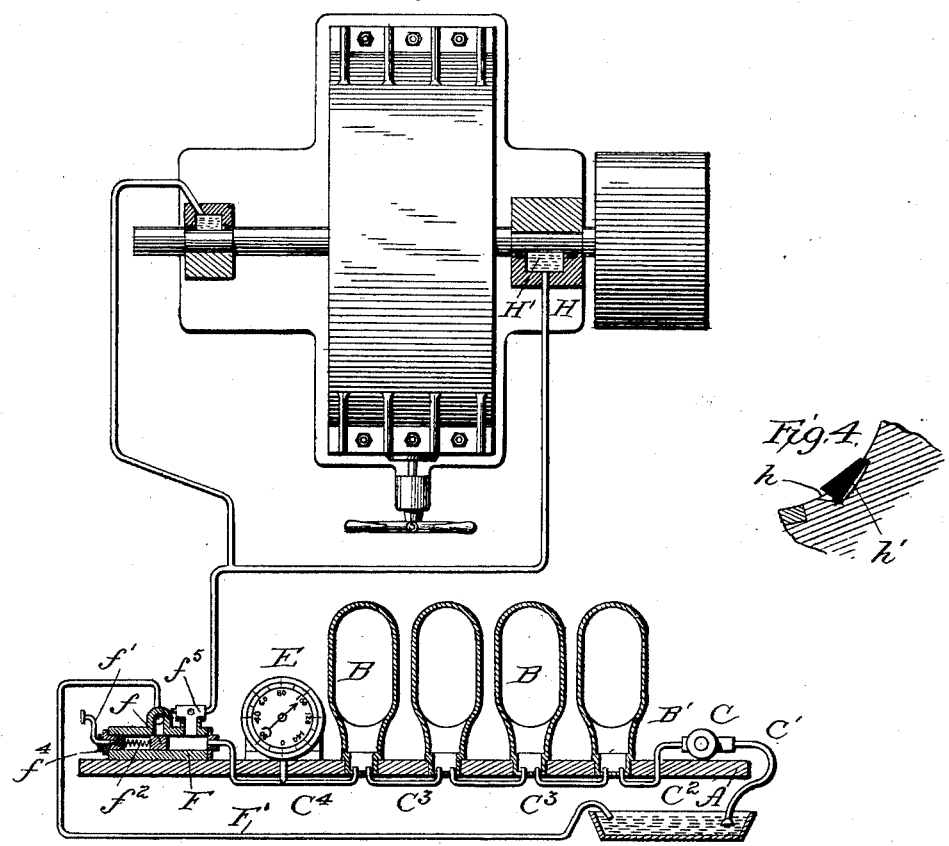
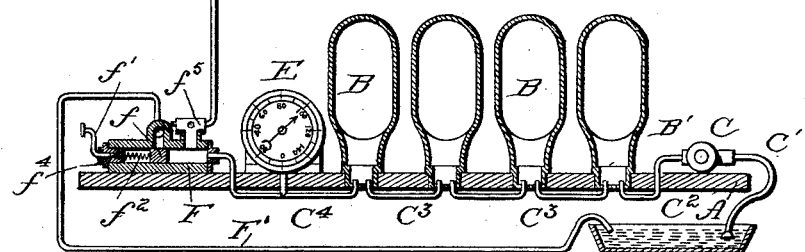
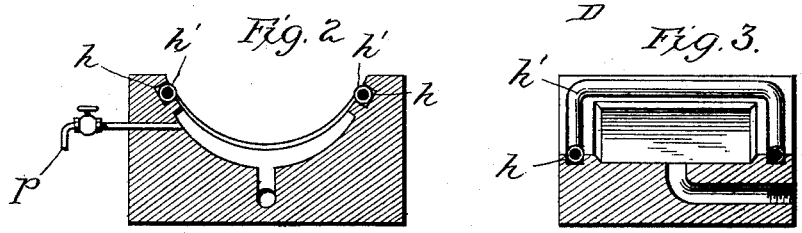
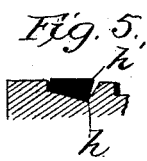
Attest
Thomas C. Newton
James H. Oong
Inventor
Walton Harrison (No Model.) 2 Sheets—Sheet 2.

W. HARRISON.
FLUID PRESSURE SHAFT SUPPORT.

No. 519,906. Patented May 15, 1894.

Attest
Thomas C. Newton
James H. Dony

Inventor
Walton Harrison

UNITED STATES PATENT OFFICE.

WALTON HARRISON, OF MERIDIAN, ASSIGNOR TO JOHN M. HARRISON, OF STARKVILLE, MISSISSIPPI.

FLUID-PRESSURE SHAFT-SUPPORT.

SPECIFICATION forming part of Letters Patent No. 519,906, dated May 15, 1894.

Application filed March 19, 1891. Serial No. 385,611. (No model.)

*To all whom it may concern:*

Be it known that I, WALTON HARRISON, a citizen of the United States, residing at Meridian, in the county of Lauderdale and State of Mississippi, having a temporary (official) residence in the city of Washington and District of Columbia, have invented certain new and useful Improvements in Fluid-Pressure Shaft-Supports; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the means of lubricating shafts and their bearings, and to provision for a constant and uniform hydrostatic pressure between bearing and shaft, whereby the working pressure is resisted by a hydrostatic pressure of intensity equal therewith, and of direction contrary thereto.

In the accompanying drawings like letters indicate like parts.

Figure 6:
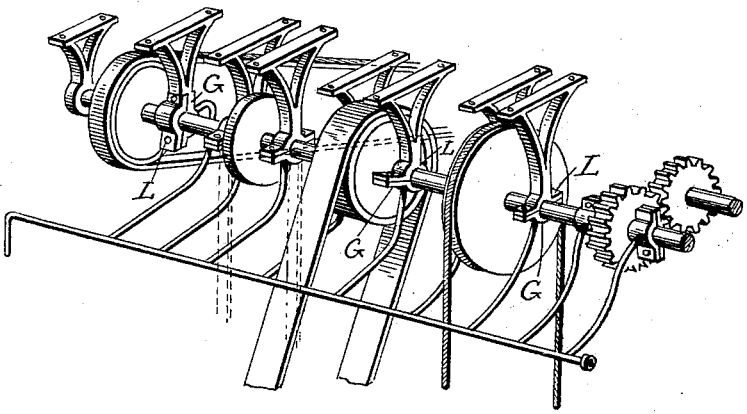
Figure 7:
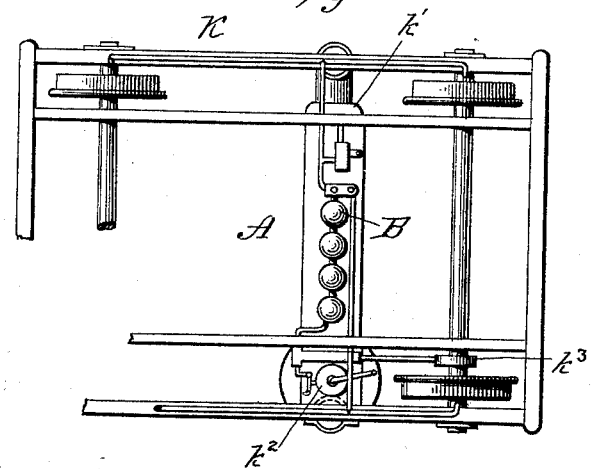

Figure 1 shows in section my improved supply apparatus, whereby a hydrostatic pressure is produced, maintained, equalized, indicated, relieved, adjusted and distributed to a large number of bearings of diverse kinds and different types, comprising a general system. In the upper portion of the figure is also shown in section one application of the invention—a couple of my improved fluid-bearings, of a certain type suitably constructed and mounted for use upon the shaft of a dynamo, and filled with liquid subjected to the pressure. Fig. 2 shows my improved part, as intersected by a plane at right angles with the shaft seat. Fig. 3 is a section of said base, or part sustaining the working pressure, showing the same as split by a plane parallel with the axis of the shaft-seat. In these figures, the packing shown is elastic and somewhat flexible. In Figs. 4 and 5 are shown enlarged sections of a valvular packing of leather. Fig. 6 shows a number of my improved fluid bearings, as ordinarily applied to a shaft, and upon which shaft the undesirable working-pressures of different intensities and of independent radial directions are being buffed by equivalent anti-frictional fluid-pressures, exerted from said bearings in the several contrary directions. Fig. 7 is a plan or top view of a car truck, provided with four of my bearings of the shape set forth in Figs. 2 and 3, as being supplied with hydrostatic pressure from my improved supply-apparatus, A, the details of which are exhibited to better advantage in Fig. 1, as above mentioned.

In setting forth my invention the supply apparatus will first be described, as shown in the lower part of Fig. 1. A suitable base, A, has a series of air-chambers, B, mounted in suitable openings B', therein. At C is a complete force-pump of ordinary construction, communicating with the reservoir D by means of the supply pipe C', and with the nearest air-chamber B by the connecting-pipe $C^2$. The chambers communicate with each other through the pipes $C^3$, so that the liquid from the pump is caused to pass successively through the several air-chambers, and from the last chamber through the pipe $C^4$, which connects with the pressure gage E by a branch pipe, and communicates directly with the connecting-box F. Thence the liquid passes through the quadruple distributing-head $f^5$ and through four pipes connected thereto and leading to any desired number of bearings, as shown in Fig. 1 and elsewhere. In the upper part of Fig. 1, H is a hollow part of the journal box filled with the liquid H' under pressure. The connecting-box F is provided with a discharge pipe F', leading back to the reservoir. The opening of this pipe is normally closed by a valve or plunger $f$, controlled by an adjusting rod $f'$ and spring $f^2$, the tension of said spring being in turn controlled by a screw-thread on the rod and suitable lock-nuts $f^4$; the action being such that after the pressure of the spring has been so set as to make the fluid exert a given pressure (say one hundred pounds by the gage), any excess over said pressure is prevented by the valve being forced back by the liquid, thus opening automatically and letting a portion of the fluid escape. By watching the gage and adjusting and locking the rod accordingly, fluid can be delivered, at any desired pressure per square inch, to all the bearings comprising the system, whether the pump be worked by hand or power, or both, either intermittingly or continuously. The operation of the air-chambers is easily seen. Being connected serially, they destroy pulsations by acting upon them at different moments, and by "wire-drawing" the liquid. If the pumping stops the fluid pressure continues intact (except in case of leakage), as the condensed air re-acts upon the liquid and the valve $f$ closes automatically, as before stated, thus maintaining the uniform pressure throughout the system of pipes and in all the bearings employed. Usually, the bearing consists of two parts suitably mounted and bolted together, as shown in Fig. 6, one of said parts being an ordinary box, cap or cover L, and the other being provided with a packed receptacle G, to which is connected a pipe leading from the supply apparatus. To secure the best results, the liquid should comprise as nearly as possible the entire seat of working-pressure, and the fluid-area exposed to the shaft should be calculated to balance such working pressure. This can be done easily in cases where the working-pressure is uniform, and is exerted in a particular radial direction, as shown in Fig. 6. Before a bearing is placed upon the shaft, the working-strain, if it be a simple one, or the resultant of the several strains, if there be more than one, should be determined both as to precise direction and degree. This being done, the supply apparatus is adjusted so as to give the fluid any degree of pressure desired, the bearing is given a fluid area calculated, in view of said pressure, to exert a hydrostatic pressure equal to said working-pressure, and said bearing is then located directly in the seat of working-strain so as to array the fluid-pressure diametrically against the working-pressure. The cap is of course located in juxtaposition with the hollow portion of the bearing containing the liquid, there being practically no strain upon the former. Both parts being inflexible, it does not matter which one is secured to the woodwork. In Fig. 6 the bearings are shown as thus arranged and located at different points along a shaft. The several working-pressures encountered, though differing in radial direction and in intensity of strain, are being resisted in concert by differential hydrostatic pressures actuated from a single source, employing the common standard pressure of one hundred pounds per square inch; and that, too, without causing or permitting any objectionable motions in the shaft or any of its fixtures. There is absolutely no interruption or variation of the pressure in the bearings, and no disturbance whatever in the relative arrangement of the parts. In other words, the bases, or parts containing the fluid are made to conform largely to the time-honored usage of ordinary bearings. The working-strain being thus resisted by liquid, there is practically no metallic binding, and consequently little or no friction. The complete bearings shown in this figure form entire semi-cylinders, and are provided with flanges and bolt-holes, have straight cylindrical openings for admitting the fluid, and are suitably mounted like ordinary bearings. In all other respects, they have the same form as the railroad car-bearing described elsewhere, the general shape or pattern of which is shown in Figs. 2 and 3. By making the lower parts or bases, containing the liquid strong and durable enough to sustain the working-pressure under all conditions, they can be operated as caps, or upper boxes in case of accident to the supply apparatus, or can sustain more or less of the working-pressure, if necessary.

My improved half-box, as shown in Figs. 2 and 3, consists of a segmento-cylindrical box, having a shallow pit excavated so as to comprise as nearly as possible the entire seat of working-pressure. Circumscribing this pit is an endless groove $h$, in which is located an endless integral packing $h'$, $h'$, by which the bearing is rendered fluid-tight. This packing may be composed of a core of rubber surrounded by a woven covering, or, where the rubber is soluble in the liquid used or is otherwise objectionable, leather or any suitable material may be employed. The packing shown in Figs. 4 and 5 is composed of leather, and is valvular. This latter packing, like the other, is endless, and its inner edge, or edge adjacent to the fluid, is made slightly thicker than its outer edge, and the groove is made of a proper depth to correspond, and with its metallic walls inclining slightly away from the leather edges, as shown. This packing, when removed from the groove and spread out flat, is simply an integral rectangle, having its corners and general shape similar to that of a picture frame made of four pieces, shaped according to the section shown in Fig. 5. The groove is made of proper shape to match the packing; that is, the groove at any given point is made of suitable depth to admit the packing flush with the shaft-seat and flush with the bottom of the groove when the shaft forces it into place. In those portions of the groove parallel with the axis of the shaft the bottom is flat, as shown in Fig. 5, but in the portions which are at right angles with the axis of the shaft the bottom should curve slightly, as shown in Fig. 4, said bottom describing the arc of a circle struck from a different center than that representing the axis of the shaft. Packings of other forms, however, can be used if preferred. A small pipe $p$, Fig. 2, can be inserted in the bearing if desired, for the purpose of securing a slight circulation of liquid. Such a pipe is old in the art.

In Fig. 7 the system is shown as particularly applicable to cars. The side-bars K are fitted upon the fluid-cushion bearings, which in turn rest upon the outer ends of the axles. Between these bars, and connected thereto, is the frame A, carrying the supply apparatus and reservoir, as before described. The pump is worked by the eccentric $k^3$. A telescopic joint k' is provided for securing flexibility in the frame, and a hand-pump k² is likewise added, for the purpose of bringing the lubricant up to the proper pressure, as indicated by the gage, before the car is ready to leave the yard. The approximate weight of the car, instead of resting upon a number of grinding, metallic surfaces, is supported upon as many slippery cushions composed of liquid. The counter-supports for the bearings are unnecessary in this instance, as the weight of the car is ordinarily sufficient to prevent any disturbance of the parts.

My system is peculiarly adapted for use upon heavy machinery in which large shafts are subjected to powerful strains, especially when such strains are approximately uniform and of definite radial direction.

Having thus described my invention, what I claim as new, and desire to secure by Letters Patent, is—

1. In a shaft-support, a number of co-acting cylindrical bearings, a hydrostatic receptacle for each bearing, the said receptacles being located at relatively different radial angles for the purpose of cushioning working pressures of independent radial direction, substantially as described.

2. In a shaft-support, a number of co-acting cylindrical bearings, a hydrostatic receptacle for each bearing, the said receptacles opening laterally into the space provided for the shaft, and having areas unequal for the purpose of cushioning working pressures of differential intensity, substantially as described.

In testimony whereof I have hereunto set my hand this 4th day of March, A. D. 1891.

WALTON HARRISON.

Witnesses:
 ALEX. MAHON,
 S. M. HOWARD.